United States Patent

Cruse, Jr. et al.

[11] 3,905,806
[45] Sept. 16, 1975

[54] METHOD FOR THE DIRECT REDUCTION OF IRON ORES

[75] Inventors: Clyde L. Cruse, Jr.; Arthur P. Kerschbaum, both of Middletown, Ohio

[73] Assignee: Armco Steel Corporation, Middletown, Ohio

[22] Filed: Feb. 20, 1973

[21] Appl. No.: 333,673

[52] U.S. Cl. ............................................. 75/35
[51] Int. Cl. ........................................ C21b 13/02
[58] Field of Search ........... 75/35, 34; 423/654, 653

[56] References Cited
UNITED STATES PATENTS

| | | | |
|---|---|---|---|
| 2,056,911 | 10/1936 | Schiller et al. | 423/654 |
| 3,136,623 | 6/1964 | Mader et al. | 75/35 X |
| 3,379,505 | 4/1968 | Holmes et al. | 423/654 X |
| 3,748,120 | 7/1973 | Beggs et al. | 75/35 |
| 3,749,386 | 7/1973 | Beggs et al. | 75/35 |

FOREIGN PATENTS OR APPLICATIONS 1,004,006  9/1965  United Kingdom ................. 75/35

Primary Examiner—L. Dewayne Rutledge
Assistant Examiner—M. J. Andrews
Attorney, Agent, or Firm—Melville, Strasser, Foster & Hoffman

[57] ABSTRACT

A process and apparatus for the gaseous reduction of sized iron ores wherein a steam-hydrocarbon fluid mixture, having a steam : carbon molar ratio ranging from 0.9:1 to 1.8:1, is catalytically reformed to produce a reducing gas mixture containing about 85 to 98 percent by volume carbon monoxide plus hydrogen, with a hydrogen:carbon monoxide volume ratio of at least 2:1. The reducing gas is transferred directly at elevated temperatures to a shaft furnace for reduction of ores therein, and the spent reducing gas is cleaned, cooled and dried, for use as fuel and/or cooling the reduced ores.

8 Claims, 1 Drawing Figure

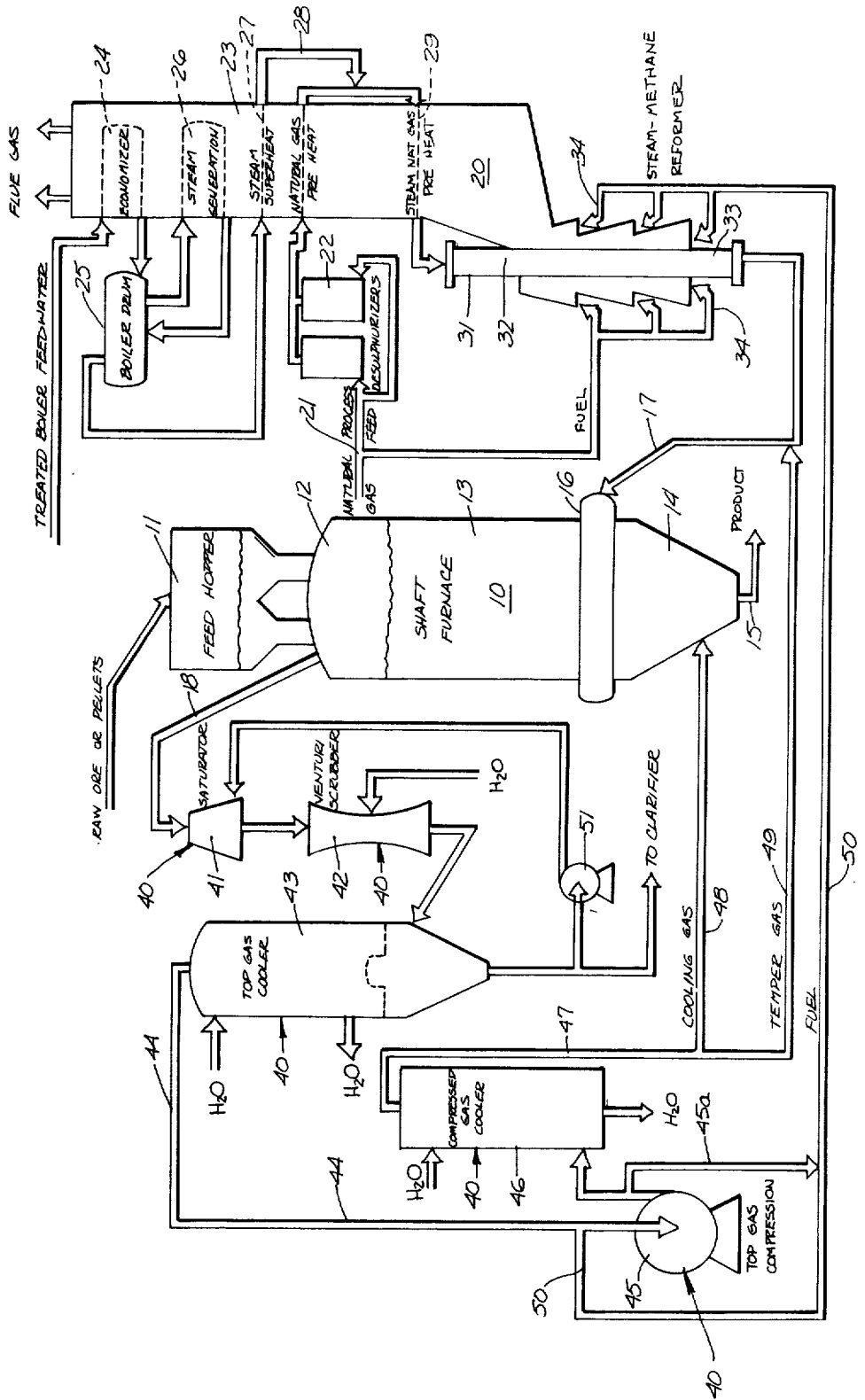

METHOD FOR THE DIRECT REDUCTION OF IRON ORES

BACKGROUND OF THE INVENTION

1. Field of the Invention

This invention relates to a method and apparatus for the gaseous reduction of sized or pelletized iron ores. More particularly, a direct ore reduction system in accordance with the invention involves a solid state process in which iron ore is conveyed into a shaft furnace where it is reduced at elevated temperatures by a highly reducing gaseous atmosphere. The invention has particular utility in the reduction of pelletized iron ore and sized ore particles ranging, e.g. between about ¼ inch and ¾ inch in diameter. For convenience the term "sized ores" will be used hereinafter to designate either beneficiated and pelletized iron ores, or ores which have been comminuted and subjected to a screening operation for separation of desired particle sizes.

The invention is equally effective for production of a partially reduced product (removal of 60 to 85 percent of the oxygen) for charging to a blast furnace, or a more completely reduced product (removal of 90 to 95 percent of the oxygen) for charging to an electric furnace for further refining in making steel.

2. Description of the Prior Art

Numerous patents and technical publications relate to gaseous reduction of iron ores either in pelletized, sized or powdered form. In general the prior art processes involve generating or reforming a reducing gas atmosphere comprising carbon monoxide and hydrogen, introducing a reducing gas atmosphere into a reduction zone containing the iron ores, subjecting the ores to gaseous reduction at elevated temperature, withdrawing the atmosphere from the reduction zone, cooling the reduced product and withdrawing it for subsequent charging to a blast furnace, or to an electric furnace.

The main components of a direct ore reduction system comprise a reducing gas generator, an ore reduction and reducing gas consumption zone, and a spent reducing gas recirculation system.

In the reducing gas generator a hydrocarbonaceous fluid, ordinarily natural gas (predominantly methane), is mixed with steam and reformed catalytically into a gas mixture of high reducing capacity. The reaction proceeds by the equation:

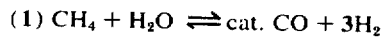

(1) $CH_4 + H_2O \rightleftharpoons \text{cat.} \ CO + 3H_2$

In the generator the reactants also undergo the water gas shift in accordance with the well known equation:

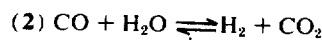

(2) $CO + H_2O \rightleftharpoons H_2 + CO_2$

The molar concentrations of the reactants, temperature and pressure conditions govern the equilibrium conditions in both equations, as is well known.

U.S. Pat. No. 3,160,498 issued Dec. 8, 1964 to T. F. Olt et al and U.S. Pat. No. 3,020,149 issued Feb. 6, 1962 to B. S. Old et al, are illustrative of prior art processes wherein a reducing gas atmosphere passes through the ore reduction stage or stages without recirculation or recycling to the reducing gas generator.

Another body of prior art involves the recycling of all or a portion of the atmosphere withdrawn from the ore reduction stage back through the reducing gas generator for regeneration with methane or other low molecular weight hydrocarbon, the reforming agent being oxygen, carbon dioxide, or water vapor. U.S. Pat. Nos. 3,375,098 and 3,375,099, issued Mar. 26, 1968 to W. E. Marshall, and U.S. Pat. No. 3,148,059, issued Sept. 8, 1964 to L. vonBogdandy, are examples of processes involving recycling of a reducing gas atmosphere for regeneration.

In the above mentioned Old et al U.S. Pat. No. 3,020,149, natural gas, air and steam are introduced into a chamber for reformation in the presence of a nickel catalyst at a temperature between about 750° and 1200°C. The reducing gas atmosphere leaving the chamber contains about 21 percent carbon monoxide, about 49 percent hydrogen, small amounts of carbon dioxide and water vapor, and the balance nitrogen. This reducing gas atmosphere is conducted directly from the catalyst chamber to a final reduction stage in a fluidized bed system, at a temperature not less than about 700°C. The reducing gas atmosphere is then conducted to successive stages of the fluidized bed system with intermediate removal of entrained particles from the gas and reheating of the gas, and the gas withdrawn from the final reduction stage is utilized as a fuel.

In the process of the above mentioned Olt el al U.S. Pat. No. 3,160,498, steam and methane are reformed under superatmospheric pressure and at elevated temperature in the presence of a catalyst. The reducing gas mixture withdrawn from the reformer contains about 11.5 percent carbon monoxide, about 54 percent hydrogen, about 5 percent carbon dioxide, about 25 percent water, about 5 percent methane and balance nitrogen. The reducing gas atmosphere is then cooled in order to remove the excessive amount of water vapor therein. After cooling and condensation of moisture the reducing gas mixture contains about 15 percent carbon monoxide, about 71 percent hydrogen, about 7 percent carbon dioxide, about 1 percent water, about 6 percent methane and balance nitrogen. It is then necessary to reheat the gas to a temperature of about 870°C before it is conducted to the reactor for reduction of the iron ore.

While the reducing gas atmospheres produced in the processes of the above mentioned U.S. Pat. Nos. 3,020,149 and 3,160,498 have a hydrogen to carbon monoxide volume ratio greater than 2:1, which is desirable because hydrogen has a more rapid rate of reduction than carbon monoxide, the reducing gas atmospheres of these prior art processes were relatively inefficient since they contained less than about 85 percent by volume of hydrogen plus carbon monoxide. This required throughput of a relatively high volume of reducing gas atmosphere with consequently high capital expense for pumps, compressors, conduits and associated equipment capable of handling high volume flows. Moreover, in U.S. Pat. No. 3,160,498 the high percentage of water vapor in the reducing gas atmosphere withdrawn from the catalytic reformer required the provision of a gas cooler for condensation of water vapor, followed by a preheat furnace for reheating the atmosphere back to the elevated temperature needed for the endothermic reduction of the ores. Even after removal of moisture the gas mixture contained a maximum of about 86 percent by volume of hydrogen plus carbon monoxide.

It is therefore a principal object of the present invention to provide a continuous, efficient process and apparatus for the gaseous reduction of iron ores wherein a reducing gas atmosphere is generated by reforming a hydrocarbonaceous fluid solely with steam in the presence of a nickel catalyst, which atmosphere contains a relatively small amount of water vapor and from about 85 to about 98 percent by volume of hydrogen plus carbon monoxide, thereby permitting the reducing gas atmosphere to be conducted at elevated temperature directly to the reducing zone of a shaft furnace containing sized iron ores.

It is a further object of the invention to utilize substantially all the heat values of the top gases withdrawn from the shaft furnace after reduction of the ores.

SUMMARY

In the process of this invention elimination of air in feed mixture and a low steam to carbon ratio in the reformer feed mixture, viz. a molar ratio ranging from about 0.9:1 to about 1.8:1, result in the generation of a reducing gas mixture containing a relatively small amount of water vapor and at least about 85 percent hydrogen plus carbon monoxide by volume. The recent availability of efficient catalysts has made it possible to eliminate the prior art practices of adding an excess of steam in order to cause the reaction of equation (1) above to move toward the right and to avoid carbon deposition on the catalyst, or adding air to supply part of the oxygen involved in the reformation reactions. Consequently, a reducing gas mixture of high quality is obtained by precluding the presence of the large amounts of water vapor and/or nitrogen inherent in the previously mentioned prior art processes.

The prior art practice of recycling top gas for use as reformer feed is also eliminated in the present process. Accordingly, a recycle compressor of large capacity is not needed.

The hydrogen to carbon monoxide volume ratio of the reducing gas atmosphere generated with a low steam to carbon ratio in the presence of an efficient catalyst is at least about 2:1, thereby assuring rapid reduction of the iron ores. The reducing gas mixture is transferred directly to a reducing section of a shaft furnace, since the relatively low moisture content of the mixture avoids the necessity for cooling and condensing water vapor. The gas exits the reformer at a temperature of about 700° to 980°C and hence can be fed directly to the reducing section of a shaft furnace with only slight moderation in temperature, the preferred temperature range for reduction being about 650° to about 930°C. The gas mixture is withdrawn from a top section of the shaft furnace after reduction of the ores and is cleaned, cooled and dried. The cleaned, cooled and dried top gas may then be utilized as a fuel for reforming, steam generation and preheating, or may be sold to gas producers. Preferably a portion of the cleaned, cooled and dried top gas is used to cool the reduced iron ores in a lower section of the shaft furnace to a temperature below the reoxidation temperature before the reduced product is discharged to atmosphere.

As is well known, sulfur poisons nickel catalysts, and the fresh feed, which is ordinarily methane, is thus first desulfurized, preheated, and mixed with superheated steam; the mixture is then preheated to a temperature of about 540°C for introduction into the catalytic reformer. Since none of the top gas is recycled for use as reformer feed, sulfur which may have been picked up from the iron ores cannot come in contact with the reformer catalysts, thereby avoiding possible loss of effectiveness of the catalyst by sulfur poisoning and eliminating a major cause of "down time" in the operation of the system.

The apparatus of the invention comprises a reformer having a two-stage elemental nickel catalyst, a shaft furnace having a top section, an intermediate reducing section and a lower cooling section, means for transferring the reducing gas atmosphere generated in the reformer directly to the reducing section of the shaft furnace, means for withdrawing the off gas from the top section of the shaft, means for cleaning, cooling and drying the withdrawn top gas, and means for delivering at least a portion of the top gas to the reformer for combustion as fuel. In the preferred apparatus means are also provided for introducing a portion of the cleaned, cooled and dried top gas into the cooling section of the shaft furnace to cool the reduced ores to below the reoxidation temperature, and means are provided for mixing a portion of the cleaned, cooled and dried top gas with the reducing gas atmosphere generated in the reformer prior to introduction of the atmosphere into the reducing section of the shaft furnace, in order to lower the temperature of the reducing gas atmosphere as needed.

BRIEF DESCRIPTION OF THE DRAWING

Reference is made to the sole FIGURE which is a flow chart illustrating an exemplary embodiment of the process of the invention and indicating diagramatically the apparatus of the invention.

DESCRIPTION OF THE PREFERRED EMBODIMENTS

Referring to the accompanying drawing, an ore reduction and reducing gas consumption zone is indicated generally at 10, a reducing gas generator and associated elements are indicated generally at 20, and a spent reducing gas recirculation system is indicated generally at 40.

A feed hopper 11, above an upper portion 12 of a shaft furnace, is provided into which sized ores or pellets are delivered by a conveyor or other conventional means. The ore is fed by gravity into an intermediate reducing zone 13 of the shaft furnace which is maintained at a temperature of about 650° to 930° C, by reason of the introduction of a heated reducing gas mixture, as will be described hereinafter. Reduction of the ores occurs in the section 13 of the shaft furnace, and the ores move gradually downwardly by gravity feed to a lower cooling section 14 having inwardly tapering sides. The reduced ore is cooled to a temperature below the reoxidation temperature in section 14 and discharged from the bottom portion of the shaft furnace by conventional means indicated at 15.

The reducing gas mixture may be introduced through tuyeres or other conventional gas inlet openings spaced around the perimeter of the shaft furnace, as indicated diagrammatically at 16, through a conduit 17. A preferred inlet temperature is about 870°C, and the gas may be introduced at a pressure varying from slightly above atmospheric to several atmospheres of pressure.

In the reducing gas generator indicated generally at 20, a hydrocarbonaceous reactant, preferably natural gas, is introduced through conduit 21 and passed through desulfurizers indicated diagrammatically at 22, preferably comprising chambers containing activated charcoal. Other conventional desulfurizing agents may however be used. A heat exchange unit indicated diagrammatically at 23 is provided through which hot products of combustion from a steam-methane reformer unit are passed in order to preheat the desulfurized natural gas fuel. Treated feed water is also heated in economizer coils 24 in the heat exchange unit 23, and fed to a boiler 25. The underflow from the boiler 25 passes through steam generation coils 26 located in heat exchange unit 23. Steam overflow from boiler 25 is conducted to a steam superheater 27 positioned in heat exchange unit 23, and the superheated steam is used to operate pumps and compressors, while a portion of the superheated steam is conducted through a conduit 28 for mixing with the desulfurized preheated natural gas. The steam and methane mixture is then passed through a further preheating stage indicated at 29 in the heat exchange unit 23 in which the temperature is raised to about 540°C. The preheated steam-methane mixture is then conducted to a catalytic reformer indicated by numerals 31–34. A preferred embodiment comprises one or more tubular chambers 31, each containing a two-stage catalyst 32, 33. The reformer feed passes downwardly through the tubes 31, and in one embodiment the upper portion 32 of the catalyst bed is a potassium-promoted elemental nickel type catalyst, while the lower portion of the bed 33 is a conventional elemental nickel catalyst on an alumina base. In another embodiment, the upper portion of the bed 32 comprises a hard relatively slow acting elemental nickel catalyst, while the bottom portion 33 comprises conventional elemental nickel catalyst. In the embodiment having the potassium-promoted catalyst in the top portion carbon fouling in the upper part of the tube is avoided by promoting the reaction $C + H_2O \rightarrow H_2 + CO$. In the embodiment having a relatively slow acting catalyst in the upper portion 32, a very hard supporting base is utilized to resist breaking up in the event of carbon deposition. In either embodiment there is no tendency to deposit carbon in the lower portion because of the high temperature (about 980°C) therein.

In connection with the problem of carbon deposition, it should be recognized that operation of the reformer within the temperature range of about 480° to about 540°C results in the maximum tendency toward deposition of carbon. Above this temperature range the tendency toward carbon deposition gradually decreases, and at a temperature of about 980°C no appreciable carbon deposition occurs.

Heat for the endothermic reformation reaction is supplied by burning fuel in burners indicated diagrammatically at 34. The fuel may be raw natural gas, both raw natural gas and cleaned and dried top gas from the shaft furnace, or solely cleaned and dried top gas.

The steam-methane mixture is reformed by the catalyst into a gas mixture of high reducing quality, containing at least about 85 percent by volume of carbon monoxide and hydrogen, the remainder being $H_2O$, $CO_2$, $CH_4$ and $N_2$. A typical but non-limiting reducing gas analysis, in percent by volume, is as follows:

| | |
|---|---|
| CO | 21.2% |
| $H_2$ | 69.2 |
| $H_2O$ | 7.9 |
| $CO_2$ | 1.5 |
| $CH_4$ | 0.2 |
| $N_2$ | Trace |

As indicated previously the reducing gas mixture issuing from the steam-methane reformer is conducted by conduit 17 directly to inlets 16 into the intermediate section of the shaft furnace. The reducing gas mixture exiting the reformer will be within the temperature range of about 700° to about 980°C and preferably will be tempered or moderated somewhat in temperature by mixing therewith a minor portion of cleaned and dried top gas, in order to introduce the reducing gas mixture into the shaft furnace at a temperature between about 650° and about 930°C.

Turning next to a consideration of the spent reducing gas recirculation system indicated generally at 40, spent reducing gas, referred to as top or off gas, is conducted from the top portion of the shaft furnace through conduit 18 to a saturator 41 which saturates the top gas, thence to a Venturi scrubber 42 wherein any entrained solids are wetted. The solids and water are separated from the gas in the separator at the bottom of the Venturi and cooler. The clean top gas, which is subjected to further cleaning and cooling with water in a cooler 43, is withdrawn from the top thereof and a portion of it is conducted through conduit 44 to a compressor 45 for pressurizing to a pressure slightly above that existing in the interior of the shaft furnace and in the reducing gas conduit 17. The clean wet gas from compressor 45 is cooled and dried in compressed gas cooler 46 which is provided with additional water cooling means. This gas is withdrawn through conduit 47, and a portion may be used for cooling reduced ores in the cooling section 14 of the shaft furnace, a conduit 48 being shown for this purpose, while a further portion may be used for lowering the temperature of the heated reducing gas mixture from the reformer, a conduit 49 being shown for this purpose.

A portion of the clean top gas is diverted from conduit 44 to and through conduit 50 (thus by-passing compressor 45) as fuel for the steam-methane reformer, which may be supplemented by raw natural gas, as indicated previously. Alternatively, dependent upon locality and/or fluctuations in fuel costs, all or part of the cleaned, cooled and dried top gas may be sold to outside gas producers, thereby reducing the net processing cost.

A by-pass conduit 45a is provided at the outlet from the compressor 45 through which a small stream of compressed gas (which is heated as a result of compression) is fed into the fuel conduit 50 in order to prevent condensation in the fuel gas line, the remainder being fed to compressed gas cooler 46.

It will be apparent from the above discussion that when a portion of the top gas is used to heat the reformer, the heated products of combustion help in preheating the steam-natural gas mixture, the natural gas, the steam super-heat and the economizer, finally exiting the heat exchange unit 23 as cooled flue gas.

It should further be noted that none of the cleaned, cooled top gas is commingled with the steam-natural gas mixture which constitutes the fresh feed to the reformer. Hence sulfur compounds or other catalyst poisons which might be picked up by the reducing gas mixture from the ores in passing upwardly through the shaft furnace cannot come in contact with the catalyst. Accordingly, catalyst life is prolonged and the necessity for periodic shut-down to restore normal catalyst activity is eliminated.

The portions of cooled top gas which may be introduced into the cooling section 14 of the shaft furnace or into the hot reducing gas conduit 17 will of course pass upwardly through the shaft furnace and aid in the reduction of iron ores in the reducing section 13 since the reducing quality of the top gas is partially restored as a result of cleaning and drying.

In an exemplary installation having a nominal ore feed rate of about 1500 tons per day and a nominal product recovery of about 1100 tons per day, a natural gas feed rate of about 10,600 standard cubic feet per minute (SCFM) and a superheated steam feed rate of about 43,100 pounds per hour, a reducing gas mixture of about 47,100 SCFM is produced and delivered to the shaft furnace. About 69,900 SCFM top gas is withdrawn from the shaft furnace, and about 18,400 SCFM of cleaned and cooled top gas is fed to the cooling section of the shaft furnace for cooling reduced ores and to act as a bottom seal, while about 32,400 SCFM of cleaned cooled top gas is utilized as fuel in the steam-methane reformer.

In the above exemplary embodiment the molar steam:carbon ratio of the steam-methane mixture was about 1.4:1, and this is a preferred ratio. However, as indicated previously, steam:carbon ratios ranging from about 0.9:1 to about 1.8:1 can be used, the preferred range being about 1.2:1 to about 1.6:1. If carbon deposition in the reformer is not a problem, as where a very hard, relatively slow-acting catalyst is used in the upper portion which resists breaking up when carbon is deposited, a steam-carbon ratio of 0.9:1 to 0.95:1 may be used. Throughout the above broad range of steam:carbon ratios the reformed reducing gas mixture will contain from about 85 to about 98 percent by volume carbon monoxide plus hydrogen. The water vapor will range from about 1 percent by volume at a steam:carbon ratio of 0.9:1 to about 14 percent by volume at a steam:carbon ratio of 1.8:1. The hydrogen:carbon monoxide volume ratio will be at least about 2:1 and in the preferred range will be about 3:1.

Referring again to the drawing, steam generated in the coils 26 is used to drive the top gas compressor 45 and the pump 51 for recycling water from the bottom of cooler 43 to saturator 41.

From the above description it is apparent that the present invention provides a process and apparatus which attain the principal and ancillary objects hereinabove set forth. Modifications may be made without departing from the invention, and no limitations are to be inferred except insofar as specifically set forth in the claims which follow.

The embodiments of the invention in which an exclusive property or privilege is claimed are defined as follows:

1. A process for the gaseous reduction of sized iron ores, comprising the steps of:
  a. generating a reducing gas atmosphere by reforming a feed mixture consisting of a hydrocarbonaceous fluid and steam in the presence of a nickel catalyst at a temperature of about 700° to about 980°C, the molar ratio of steam:carbon in the feed mixture ranging from about 0.9:1 to about 1.8:1, under conditions such that said reducing gas atmosphere as generated consists essentially of about 85 to about 98 percent hydrogen and carbon monoxide by volume, and about 1 to about 14 percent water vapor by volume, the hydrogen:carbon monoxide volume ratio being at least 2:1;
  b. transferring said reducing gas atmosphere generated in step (a) directly to a reducing portion of a shaft furnace containing said sized ores;
  c. subjecting said ores to gaseous reduction in said reducing portion of said shaft furnace at a temperature of about 650° to about 930°C in said reducing gas atmosphere;
  d. withdrawing said gas atmosphere from a top section of said shaft furnace after reduction of said ores by said atmosphere;
  e. cleaning, cooling and drying the withdrawn top gas;
  f. compressing a portion only of the cleaned and cooled top gas to a pressure greater than the pressure in said shaft furnace; and
  g. passing said reduced ores into a cooling portion of said shaft furnace, thereby cooling the ores to below reoxidation temperature, and removing the cooled, reduced ores from said furnace.

2. The process claimed in claim 1, wherein a portion of said cleaned, cooled and dried top gas is mixed with said reducing gas atmosphere during transfer thereof to said shaft furnace.

3. The process claimed in claim 1, wherein the reduced iron ores are cooled by introducing a portion of said cleaned, cooled and dried top gas into said cooling section of said shaft furnace.

4. The process of claim 1, wherein said catalyst is arranged in two stages, the first stage being relatively slow-acting elemental nickel supported on a very hard refractory base, and the second stage being relatively fast-acting, elemental nickel supported on a refractory base.

5. The process of claim 1, wherein said catalyst is arranged in two stages, the first stage being relatively fast acting, potassium-promoted elemental nickel supported on a refractory base, and the second stage being relatively slow-acting elemental nickel supported on a refractory base.

6. The process claimed in claim 1, wherein a portion of the cleaned and cooled top gas is utilized as fuel, wherein said hydrocarbonaceous fluid is desulfurized natural gas, and wherein said natural gas is preheated before and after mixing with steam by heat realized from said portion of top gas utilized as a fuel.

7. The process claimed in claim 6, wherein the heat realized from said portion of top gas is further used to generate and superheat steam.

8. The process claimed in claim 6, wherein said portion of top gas utilized as fuel is used as heat for reforming.

* * * * *